# United States Patent [19]

Shinohara

[11] 4,450,186
[45] May 22, 1984

[54] METHOD AND DEVICE FOR MANUFACTURING MAGNETIC RECORDING MEDIUM

[75] Inventor: Koichi Shinohara, Hyogo, Japan

[73] Assignee: Matsushita Electric Industrial Co., Ltd., Osaka, Japan

[21] Appl. No.: 409,608

[22] Filed: Aug. 19, 1982

[30] Foreign Application Priority Data

Aug. 20, 1981 [JP] Japan .............................. 56-131176
Sep. 9, 1981 [JP] Japan .............................. 56-142698
Oct. 9, 1981 [JP] Japan .............................. 56-161624

[51] Int. Cl.$^3$ ............................................ B05D 3/06
[52] U.S. Cl. ...................................... 427/42; 118/50;
118/718; 118/720; 118/730; 427/39; 427/132;
427/151
[58] Field of Search ................... 427/42, 39, 132, 151;
118/50, 718, 720, 730

*Primary Examiner*—Bernard D. Pianalto
*Attorney, Agent, or Firm*—Burgess, Ryan & Wayne

[57] ABSTRACT

The invention provides a method and a device for mass-producing a magnetic recording medium which has excellent wear and corrosion resistance and uniform quality along the longitudinal and transverse directions of an elongated base body, wherein the elongated base body in a vacuum chamber is fed to continuously deposit a ferromagnetic material thereon, while a gas is sprayed in the vicinity of an incident angle control section of a mask for controlling an angle of incidence of a vapor flow from a vapor source to the elongated base body. The angle of incidence is kept constant to prevent deposition of the vapor material on the incident angle control section, and simultaneously, a uniform oxide film is formed on the ferromagnetic layer using a gas containing oxygen.

4 Claims, 7 Drawing Figures

METHOD AND DEVICE FOR MANUFACTURING MAGNETIC RECORDING MEDIUM

BACKGROUND OF THE INVENTION

I. Field of the Invention

The present invention relates to a method and a device for manufacturing a magnetic recording medium having a thin metal ferromagnetic film as a recording layer.

II. Description of the Prior Art

The coercive force of the magnetic recording medium has been increased to satisfy the needs for high-density recording. For recording and reproducing high-frequency signals, only the surface layer is magnetized. An output cannot be sufficiently increased by only an increase in coercive force.

A material which has a high saturation density of magnetic fluxes has received attention to increase the high-frequency signal output. A typical example is a medium containing a nonmagnetic material such as a binder based on the conventional coating. In this medium, ferromagnetic metal particles such as iron particles or alloy particles which have a high saturation density of magnetic fluxes are used instead of iron oxide.

Another example is a medium including a thin metal ferromagnetic film as a magnetic recording layer, which does not use a binder. Since the thin film is formed by vacuum deposition, the medium is called a "deposition tape". It is partially commercially available.

The deposition tape has been recently developed and is still in a developmental stage, so that there are many problems to be solved so as to realize wider industrial applications.

The first problem is a matter of coercive force control. Stable control of the coercive force is a significant issue in the technical developmental of the deposition tape. An oblique deposition method disclosed in Japanese Patent Publication No. 41-19389 is capable of stably controlling the coercive force. However, according to the method described above, if an angle of incidence of the material being deposited varies greatly, the change of coercive force is greatly changed; thus this method is unable to provide stable control of the coercive force.

The second problem is a matter of resistance to corrosion and abrasion of the medium. In order to solve this problem, a protective layer has conventionally often been formed on the ferromagnetic layer. However, further improvements are desired since the ferromagnetic layer and the protective layer are formed of different materials and different methods of forming the ferromagnetic layer and the protective layer are used.

SUMMARY OF THE INVENTION

It is, therefore, a first object of the present invention to provide a method for manufacturing a magnetic recording medium wherein the variation in the coercive force with a change in an angle of incidence of a vapor flow onto an elongated substrate is controlled within a practical range of industrial applications, during oblique deposition of a ferromagnetic material on the substrate.

It is a second object of the present invention to provide a method for manufacturing an excellently corrosive-resistant magnetic recording medium wherein an oxide film is formed as a protective film on the ferromagnetic layer at the same time as the ferromagnetic layer is deposited.

It is a third object of the present invention to provide a device for mass-producing a highly reliable magnetic recording medium of uniform quality.

In order to achieve the above objects of the present invention, a gas spraying port is disposed in the vicinity of an incident angle control portion of a mask which controls the angle of incidence of a vapor flowing from a vapor source to the substrate, so that deposition of the vapor on the incident angle control portion may be prevented by spraying a gas during deposition. Therefore, the angle of incidence of the vapor flow to the substrate is kept constant, and the variation of the coercive force along the longitudinal and transverse directions of the substrate is minimized.

Further, since an oxygen gas or a gas containing at least oxygen is used, a uniform oxide film is formed on the surface of the ferromagnetic layer, thus providing the corrosion resistance.

In this case, gas spraying conditions are given for providing the continuously formed oxide film uniformly along the longitudinal and transverse directions of the ferromagnetic layer on the elongated substrate.

Other objects, features and advantages of the present invention will be apparent from the following detailed description taken in conjunction with the accompanying drawings.

DETAILED DESCRIPTION OF THE PREFERRED EMBODIMENTS

Figure 1:
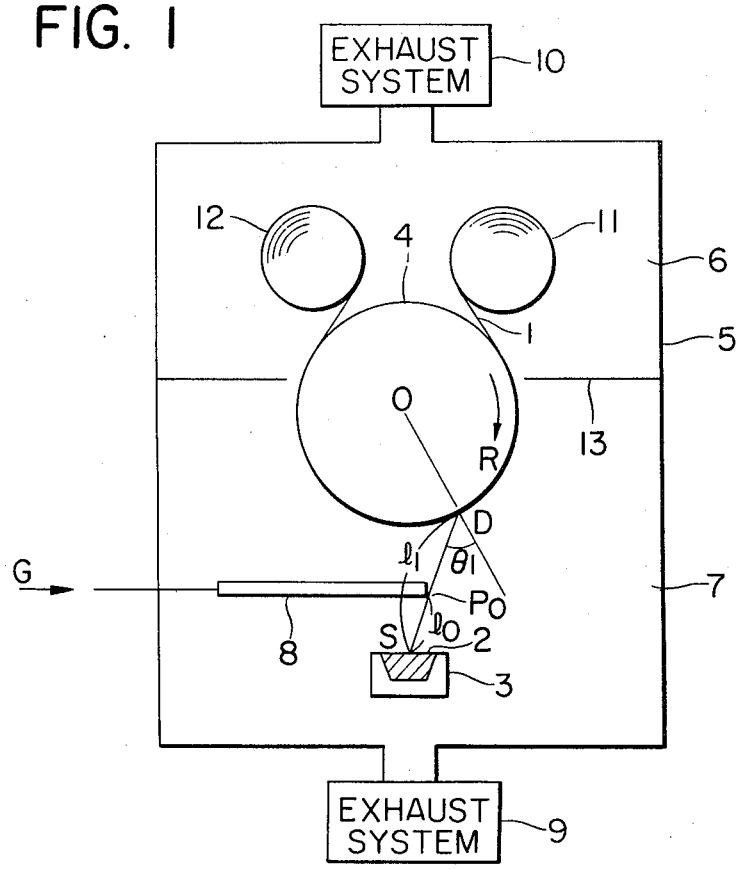
FIG. 1 is a view showing the overall arrangement of a deposition device used in an embodiment of the present invention.

FIG. 1 shows a deposition device used in the present invention. The deposition device is divided into two chambers. However, the present invention is not limited to the deposition device of this type. Various changes and modifications may be provided within the spirit and scope of the present invention.

Referring to FIG. 1, an elongated substrate 1 is supplied from a supply reel 11 to a take-up reel 12 through a rotary can 4 along the direction indicated by arrow R. Other members such as a free roller and an expander which are included in the take-up mechanism are not illustrated. However, these members are included in the take-up mechanism as needed. The rotary can 4 supports and cools the substrate 1. However, the rotary can 4 may be replaced by a cooled endless belt obtained by welding a thin sheet (SUS304) by an electron beam. Further, a plurality of rotary cans may be used for repeated deposition within the spirit and scope of the present invention. A vapor source disposed to oppose the rotary can 4 is of the type known to those who are skilled in the art. However, the vapor source is preferably heated by an electron beam. A model representing a vapor source container 3 and a vapor material 2 is illustrated in FIG. 1. Note that an electron beam source is not shown in the figure.

A vacuum chamber 5 is subdivided into an upper compartment 6 and a lower compartment 7. Reference numeral 13 denotes a partition plate. A gas is exhausted from the upper and lower compartments 6 and 7 through exhaust systems 10 and 9 respectively which are generally independent of each other. Reference numeral 8 denotes a mask for controlling an angle of incidence. The angle of incidence is defined as $\theta_1$ formed by a normal to a point D and a line SD which is an extended line of a line $\overline{SPo}$ connecting a center S of the vapor source and an end Po of the mask and which reaches the point D on the surface of the substrate (around the outer surface of the can). The mask 8 is arranged so that a gas is sprayed in the vicinity of the end Po. The magnetic vapor, therefore, may not be deposited in the vicinity of the end Po of the mask 8. As a result, the angle of incidence $\theta_1$ which is determined by the line $\overline{SPo}$ with respect to the elongated substrate 1 can be kept constant. If the above angular requirement is satisfied, the shape of the mask may be of part of an arc or of a combination of linear structures. Although the gas is preferably flowed into the chamber in accordance with known flow rate and pressure control techniques, the type of gas may be selected from an active gas, an inert gas and a mixed gas.

Examples of the present invention will be described below.

EXAMPLE 1

A polyethylene terephthalate film of 10.5 μm thickness and 500 mm width was used as a base body at an angle of incidence $\theta_1$ of 70°. A layer of Co-Ni alloy (Co: 80%; Ni: 20%) was formed on the polyethylene terephthalate to a thickness of 0.1 μm. The pressure of the lower compartment was $2 \times 10^{-5}$ Torr. The coercive force of the magnetic layer obtained was 1050 Oe. The squareness ratio was 0.96.

Figure 2:
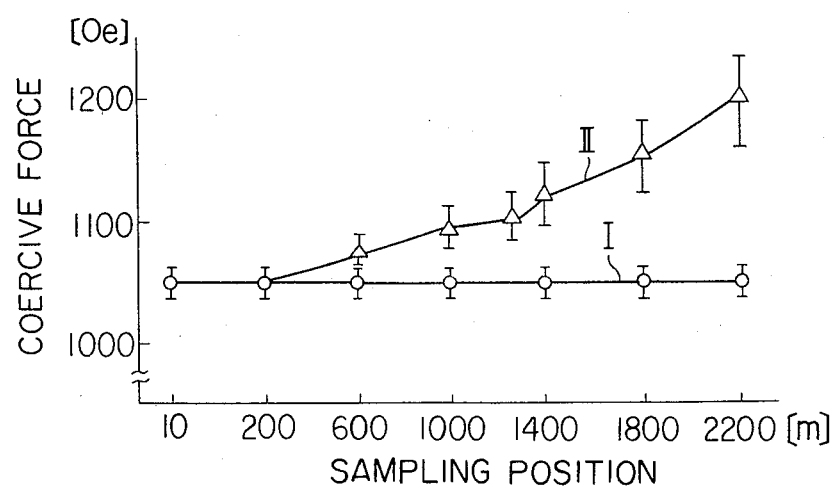
FIG. 2 is a graph for explaining the coercive force as a function of the sampling position obtained by the device according to one embodiment of the present invention in comparison with that obtained by the conventional device.

Magnetic film I was formed in an atmosphere of argon (Ar) gas supplied at a flow rate of 0.1 l/min (1 kg/cm²) according to the method of the present invention, whereas magnetic film II was formed without using a gas according to a conventional method. Results are shown in FIG. 2, in which sampling was performed along the longitudinal direction of the substrate, and the coercive force distribution is indicated by error bars in the transverse direction.

As is apparent from the above results, if the gas is not supplied, uniformity of the film along the transverse direction of the substrate is degraded and the coercive force is increased.

EXAMPLE 2

A magnetic layer of 100% Co was formed on a polyethylene terephthalate film of 15 μm thickness and 500 mm width to a thickness of 0.2 μm at an angle of incidence $\theta_1$ of 73°. The overall length of the deposited magnetic layer in an atmosphere of argon with a flow rate of 0.1 l/min (1 kg/cm²) was 2,050 m. The pressure in the lower compartment was $1.7 \times 10^{-5}$ Torr. The coercive force was 1,200 Oe at 0 m, 1,000 m and 2,000 m. The squareness ratio was 0.97. The variation in the coercive force along the transverse direction was small, whereas the coercive force of a magnetic layer formed without the Ar gas varied in a range of 1,220 to 1,410 Oe at a length of 1,000 m. At this time, the thickness of Co deposited on the end of the mask was 19 mm. The angle of incidence was thus significantly changed from the beginning to the end.

EXAMPLE 3

A magnetic layer of a Co-Cr alloy (Co: 85%; Cr: 15%) was formed on a polyethylene terephthalate film of 11.5 μm thickness and 500 mm width at an angle of incidence $\theta_1$ of 60° and at a pressure of $1 \times 10^{-5}$ Torr. A magnetic layer formed in an atmosphere of argon gas with a flow rate of 0.2 l/min (1 kg/cm²) was compared with that in an atmosphere of argon gas with a flow rate of 0.05 l/min. The coercive force at the initial portion of the layer and a portion at 1,000 m was 980 Oe. The squareness ratio was 0.98. The magnetic layers were uniform in the transverse direction thereof.

When the base body is elongated to 2,000 m and 3,000 m, the coercive force of the magnetic layer formed with the Ar flow rate of 0.05 l/min is slightly changed as compared with that with the Ar flow rate of 0.2 l/min. Thus, the coercive force of the magnetic layer slightly depends on the flow rate of the gas. Therefore, the flow rate required in formation of the magnetic layer is preferably optimized by adjusting the diameter of the nozzles and the distance between the adjacent nozzles.

EXAMPLE 4

A magnetic layer of a CO-Ni alloy (C0: 80%; Ni: 20%) was formed on a polyamide film of 8.5 μm thickness to a thickness of 0.15 μm at an angle of incidence $\theta_1$ of 45°. Oxygen was supplied to the lower compartment through the vicinity of the end of the mask. The flow rate of oxygen was 0.22 l/min (1 kg/cm²). The deposition pressure was $4.5 \times 10^{-5}$ Torr. The coercive force was 920 Oe, and the squareness ratio was 0.88. The magnetic layer was uniform over the length of 4,000 m in the longitudinal and transverse directions.

In the conventional magnetic layer, the coercive force is increased by about 15% at a portion at 1,000 m, and 34% at 2,000 m. At 3,000 m, the film supply speed must be decreased by 40% or the power of the electron beams must be increased by 30% in order to control the thickness of the deposited layer. Conversely, in the present invention, since the preset conditions can be stably maintained, the deposited film thickness can be controlled, unlike the conventional method.

The effects of the present invention have been confirmed by ion plating using a high frequency signal of 13.56 MHz with high frequency electrodes disposed between the film and the vapor source. Further, a vapor material such as Fe, Co-V, Co-W, Co-Mn, Co-Ti, Co-Si, Co-Ni-Cr and Co-Pt was used to obtain the same effects obtained in the above examples of the present invention.

A gas such as $N_2$, $CO_2$ and CO was used to confirm the effects of the present invention.

In summary, the method of the present invention is very effective regardless of the mechanism (e.g., crystal magnetic anisotropy, shape anisotropy, and distortion) of generating the coercive force.

A method for forming an oxide film on the surface of the ferromagnetic layer to improve corrosion-resistance of the magnetic recording medium will be described. Since this method does not use an additional material as is used in the conventional method, stability and reliability of the magnetic recording medium are greatly improved.

Figure 3:
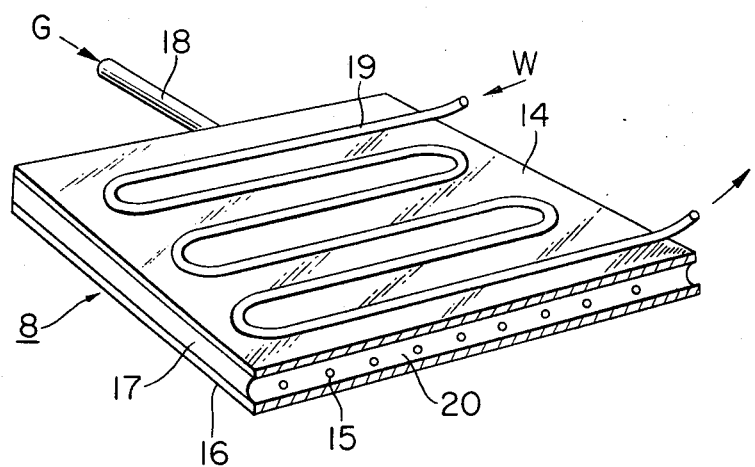
FIG. 3 is a perspective view of a mask used in the deposition device shown in FIG. 1.

In the conventional process for manufacturing the magnetic tape, a magnetic layer is continuously formed on a base body which has a width of more than 50 cm, and the base body with the magnetic layer is cut into strips of a predetermined width. It is necessary to control the thickness of the oxide layer in both the longitudinal and transverse directions of the base body, in order to achieve a uniform quality of the oxide film. In this embodiment of the present invention, a mask as shown in FIG. 3 is used for this purpose. The mask 8 has a jacket structure which has a rear surface 14 (viewed from the vapor source), a front surface 16, a side surface 17, another side surface (not shown) opposite the side surface 17, a side surface 20 and another side surface (not shown) opposite the side surface 20. A copper pipe 19 is soldered onto the rear surface 14. Cooling water W flows through the copper pipe 19 so as to prevent overheating. A gas G is introduced from a gas pipe 18 and is sprayed from a number of nozzles 15 formed in the side surface 20.

A partition plate may be inserted inside the jacket, as needed, to uniformly spray the gas from the nozzles 15. Alternatively, the shape of the jacket may be optimized hydrodynamically so that the effect of the present invention can be further emphasized. The gas may be sufficiently controlled by a known technique.

Examples showing oxide film formation according to the present invention will be described below.

Common Conditions of Examples 5 to 7

Rotary Can: 1 m in diameter and 65 cm in width
Base Body: 50 cm in width
Length $l_0$:28 cm (where $l_0$ is the distance from the center S of the vapor source to the nozzles.)
Length $l_1$:45 cm (where $l_1$ is the distance from the center S of the vapor source to the point D.)
Nozzles: 17 nozzles, each of which has a diameter of 1 mm, are aligned in the longitudinal direction of the side surface 20 of the mask at equal intervals of 4 cm.

Common Conditions of Examples 8 and 9
Length $l_0$:31 cm
Length $l_1$:35 cm
Nozzles: 33 nozzles, each of which has a diameter of 1 mm, are aligned in the longitudinal direction of the side surface 20 of the mask at equal intervals of 2 cm. Other conditions in Examples 8 and 9 are the same as those in Examples 5 to 7.

EXAMPLE 5

A polyethylene terephthalate film of 10.5 μm thickness was wound at a speed of 25 m/min. Simultaneously, 100% Co was vaporized by electron beam heating to form a magnetic layer of 0.15 μm thickness on the polyethylene terephthalate film in an oxygen atmosphere, while oxygen was supplied at a flow rate of 0.035 l/min and at a pressure of 1.5 kg/cm². The temperature of the rotary can was controlled by maintaining a circulating refrigerant at a temperature of −3° C.

Sampling was performed at 12 points along the transverse direction of the magnetic layer and 10 points along the longitudinal direction thereof to examine the magnetic characteristics, the thickness and quality, and the resistances to corrosion and wear of the oxide layer. Variation in the coercive force and the squareness ratio was within ±5%. The variation in thickness of the oxide film was ±8%. The quality of the oxide film at the above-mentioned points was uniform. Further, when the oxide film thus manufactured was placed over 8 weeks in an atmosphere having a relative humidity of 85% at a temperature of 60° C., there was no change at all.

EXAMPLE 6

A polyethylene terephthalate film of 12.5 μm thickness was wound at a speed of 30 m/min. Simultaneously, a vapor material of a Co-Ni alloy (Co: 85%; and Ni: 15%) was vaporized by electron beam heating. Oxygen was supplied at a flow rate of 0.03 l/min and at a pressure of 2 kg/cm² to obtain a magnetic layer of 0.13 μm thickness. The temperature of the circulating refrigerant of the rotary can was 0° C.

The same sampling test as in Example 5 was performed. The variation in the coercive force and the squareness ratio of the magnetic layer were ±5%. The variation in the thickness of the oxide layer was ±7%. A uniform quality oxide layer was obtained. Further, the magnetic layer did not corrode over 9 weeks at a temperature of 60° C. and at a relative humidity of 95%.

EXAMPLE 7

A magnetic layer of a Co-Ni alloy (Co: 75%; and Ni: 25%) was formed on a polyimide film of 25 μm thickness to a thickness of 0.2 μm while the polyimide film was fed at a speed of 30 m/min and oxygen was supplied at a flow rate of 0.1 l/min (1 kg/cm²). The variation in the coercive force and the squareness ratio of the magnetic layer were ±6%, and the variation in the thickness of the oxide layer was ±6%. The quality of the oxide layer was substantially the same as that obtained in the previous examples. The magnetic layer did not corrode over 9 weeks at a temperature of 60° C. and at a relative humidity of 95%.

The recording media which were obtained in Examples 5 to 7 having the respective magnetic layers thereon were cut into tapes of ¼" width. Each of the tapes was recorded for a wavelength λ=0.8μ and was wound around a reel for each 100 m. The tapes wound around the reels were placed in an atmosphere having a temperature of 60° C. and a relative humidity of 95%. After 6 and 12 weeks, the signals recorded on the tapes were reproduced. No clogging or dropout was found in these tapes. Further, recorded signals were not erroneously erased, and stable abrasion resistance was obtained.

Magnetic layers of a Co-Ni alloy (Co: 80%; and Ni: 20%), a Co-Ni alloy (Co: 70%; and Ni: 30%), a Co-Fe alloy (Co: 50%; and Fe: 50%), a Co-Rh alloy (Co: 95%; and Rh: 5%), and a Co-V alloy (Co: 95%; and V: 5%) were respectively formed on polyethylene terephthalate films of 12 μm thickness up to a thickness of 0.06 μm at an oxygen flow rate of 0.02 to 0.15 l/min. The quality of the magnetic layers was substantially the same as that in Examples 5 to 7.

An endless belt (60 cm in width and 2 m in length) of SUS 304 (0.6 t) was used in place of the rotary can as the cooling support. A polymeric base body was conveyed on the endless belt to form a magnetic layer thereon. The same effects were obtained as when the rotary can was used.

For ion plating, a high frequency coil (2 turns) which had a diameter of 60 cm was disposed substantially between the rotary can and the vapor source. Magnetic layers of a Co-Ni alloy (Co: 80%; and Ni: 20%), a Co-W alloy (Co: 95%; and W: 5%), and Co (100%) were respectively formed to a thickness of 0.1 μm on polyethylene terephthalate films each of which had a width of 50 cm, at an angle of incidence of more than 15° and at an oxygen flow rate of 0.015 l/min. The films were fed at a speed of 15 m/min. The high frequency power was 450 W, and the frequency was 13.56 MHz.

The obtained magnetic layer was of substantially the same quality as those in the previous examples.

EXAMPLE 8

A Co-Ni alloy (Co: 90%; and Ni: 10%) was vaporized by electron beam heating while a polyethylene terephthalate film of 9.5 μm thickness was being wound at a speed of 35 m/min and oxygen was supplied at a flow rate of 0.4 l/min and at a pressure of 1 kg/cm². Thus, a magnetic layer of 0.16 μm thickness was obtained. The variation in the magnetic characteristics of the magnetic layer was ±4%. The variation in the thickness of the oxide layer was ±6%. The quality of the oxide layer was uniform. The magnetic layer did not corrode over 10 weeks at a temperature of 60° C. and at a relative humidity of 95%. Thus, a highly reliable magnetic layer was obtained.

EXAMPLE 9

A Co-Ni alloy (Co: 83%; and Ni: 17%) was vaporized by electron beam heating, and a magnetic layer of 0.2 μm thickness was deposited on a polyamide film of 8 μm thickness which was being wound at a speed of 25 m/min at an oxygen flow rate of 0.1 l/min (2.1 kg/cm²). Thereafter, the surface of the magnetic layer was exposed to glow discharge (glow discharge conditions: 500 V and 77 A) in an oxygen atmosphere at a pressure of 0.1 Torr for 2.5 sec. The variation in the magnetic characteristics was ±5.5%, and the variation in the thickness of the oxygen layer was ±5.5%. Further, a uniform quality oxide layer was obtained. The magnetic film did not corrode over 17 weeks at a temperature of 60° C. and at a relative humidity of 95%. A highly reliable magnetic layer was obtained.

In the above examples, the effect of the present invention can be found when the length of the deposited magnetic layer is more than 1,000 m. The output stability of ±0.2 dB can be given at a length of 2,000 m of the deposited magnetic layer. The output stability of ±0.23 dB can be given at a length of 3,000 m of the deposited magnetic layer. Further, the output stability of ±0.2 dB can be given at a length of 4,000 m.

A process has conventionally been performed in which a substrate is continuously moved to form a thin film thereon while a gas is supplied to a vacuum chamber. However, the scale of deposition using a gas is small. Therefore, if such deposition is performed for an elongated substrate, unknown problems may be presented.

The take-up deposition devices have been widely used in the fields of laminate boards and electric components such as capacitors. The production quantity is several tens of thousand meters per batch. In many cases, the deposition materials are limited to low-melting point materials such as Al and Zn. In the field of magnetic tapes and magnetic discs, problems are encountered when the substrate is elongated.

There are two control methods for supplying a gas: one method is for controlling the flow rate of the gas; and another method is for controlling the pressure of the gas. It is important to control the gas supply with high precision by these methods. It is, however, difficult to control the characteristics of the magnetic tape by these methods, as is shown in FIGS. 4A and 4B.

Figure 4A:
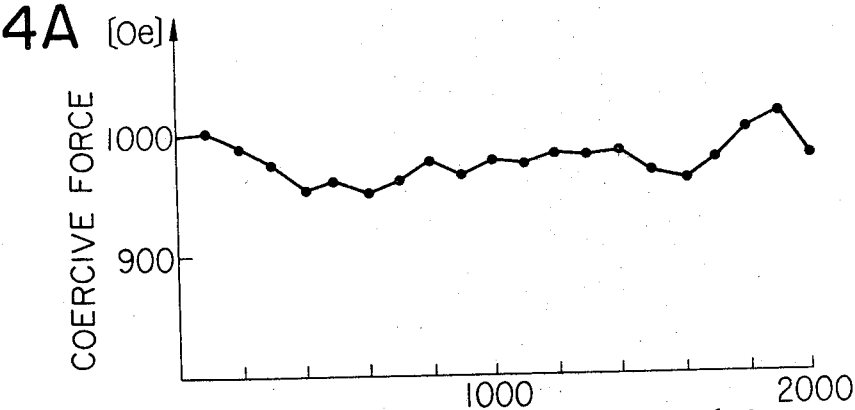
FIG. 4A is a graph for explaining the coercive force as a function of the length of a magnetic layer deposited on a substrate under a controlled oxygen flow rate.
Figure 4B:
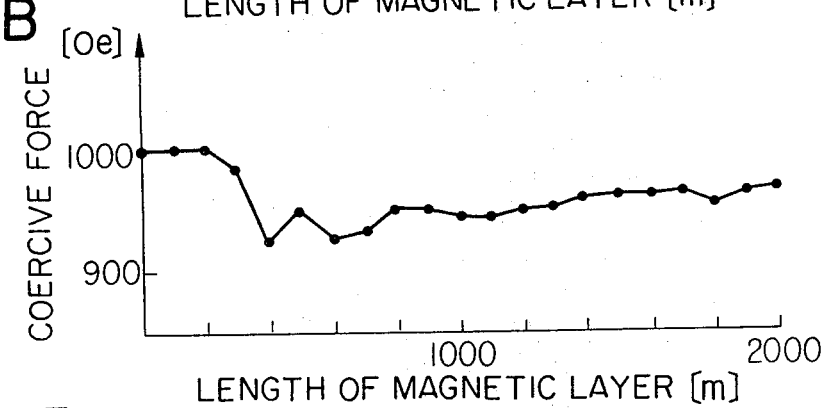
FIG. 4B is a graph for explaining the coercive force as a function of the length of the magnetic layer deposited on the substrate under a controlled pressure.

FIG. 4A shows a change in the coercive force as a function of the length of the deposited layer when a polyethylene terephthalate film of 9.5 μm thickness is moved at a speed of 30 m/min along the rotary can which has a diameter of 1 m and a temperature of 20° C., while oxygen is supplied at a flow rate of 0.35±0.01 l/min, and when Co is deposited on the polyethylene terephthalate film at an angle of incidence which is greater than 40°. FIG. 4B shows a change in coercive force when Co is deposited on the polyethylene terephthalate film in the same manner as described above, while oxygen is supplied in a vacuum chamber which is kept at a pressure of $3.5 \times 10^{-5}$ Torr (±5%).

By extensive study of a change in the coercive force in the longitudinal direction of the film, it is found that the change results from the relationships among the amount of gas supplied from the outside to the vacuum chamber, the gas released from the components of the vacuum chamber such as the inner wall, a melting pot and mask, and leakage of the atmospheric gas.

Figure 5:
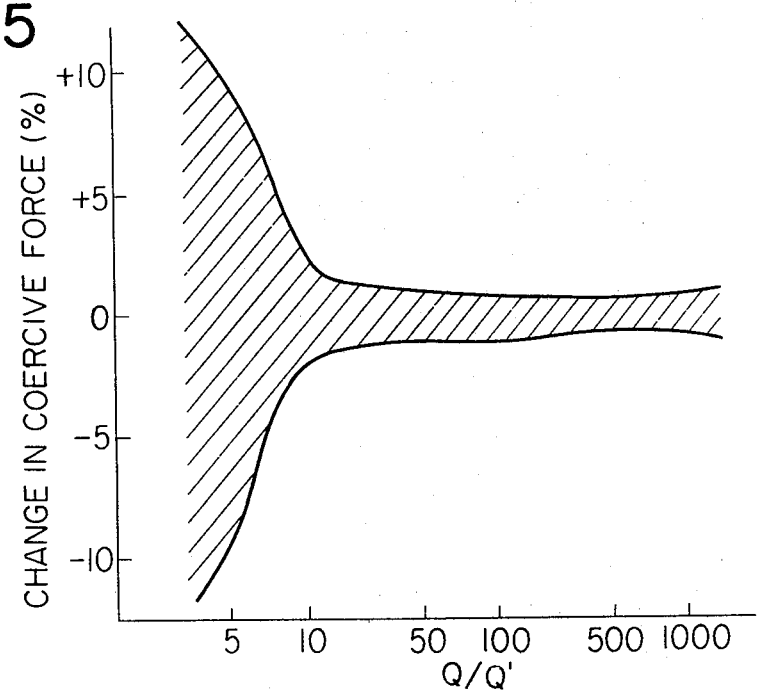
FIG. 5 is a graph for explaining a change (percentage) in coercive force as a function of the ratio of the amount Q of the supplied gas to the sum Q' of the amounts of exhausted gas and leakage gas.

If an amount of supply gas is defined as Q (Torr l/sec), and a sum of the released gas and the leakage gas is defined as Q' (Torr l/sec), the coercive force varies depending on the ratio Q/Q', as shown in FIG. 5. As may be apparent from the above relation, the variation in the coercive force is minimized when the amount Q is larger than 10Q'. However, in practice, the relation between Q and Q' need not be maintained at Q=1000Q'. In fact, Q may be set anywhere in the range 10Q' to 100Q'.

The sum Q' should be suitably smaller than the amount Q so as to optimize the manufacturing cost as far as is consistent with satisfying the required precision and quality.

In the inequality Q>10Q', a large Q satisfies Q' even if Q' is relatively large. However, when this relation is applied to the manufacture of a magnetic tape, the amount Q is often determined so as to obtain a desired coercive force. Therefore, a practical range of the amount Q must take priority over that of the sum Q'. The sum Q' is then determined in accordance with the preset value of the amount Q.

There are several methods for satisfying the above conditions with the take-up deposition device. A vacuum $P_{eq}$ of a base material portion which is close to the deposition area is given by the following relation:

$$P_{eq} = Q_v/S_v + Q_l/S + P_o \qquad (1)$$

where $Q_v$ is the amount of exhaust gas (Torr l/sec), $S_v$ is the evacuation rate of gas with respect to the exhaust gas (l/sec), $Q_l$ is the amount of leakage air (Torr l/sec), S is the evacuation rate of gas with respect to the leakage air (l/sec), and $P_o$ is the pressure of the pump. In accordance with the above relation, $Q' = Q_v + Q_l$ is measured. Co and Co-Ni (Co: 80%; and Ni: 20%) are respectively deposited over a length of 10,000 m to a thickness of 0.1 μm to obtain deposited films by changing the ratio of Q to Q'. The coercive forces of these deposited films are examined, and the results are shown in FIG. 5.

In order to decrease the sum Q':

(1) The preliminary evacuation duration may be prolonged (the atmospheric gas is generally evacuated for 60 minutes and deposition is performed in the conventional methods; but the atmospheric gas is exhausted for 10 hours in the present invention).

(2) A pump with a high evacuation rate may be used (Two pumps may be used in place of a single oil diffusion pump).

(3) A stainless steel may be used for the inner wall and constituting parts of the vacuum chamber so as to minimize the released gas.

(4) A jacket structure may be utilized for the inner wall and the constituent parts of the vacuum chamber. In the preliminary step, a heating medium at a temperature of 120° C. to 200° C. is circulated in the vacuum chamber to accelerate the release of the gas contained in the vacuum chamber. Thereafter, a refrigerant (e.g., temperature of ±0° C. to +20° C.) is supplied to the chamber to control the exhaust gas.

Among the four methods, method (4) and a combination of methods (3) and (4) are most suitable in consideration of economy.

Figure 6:
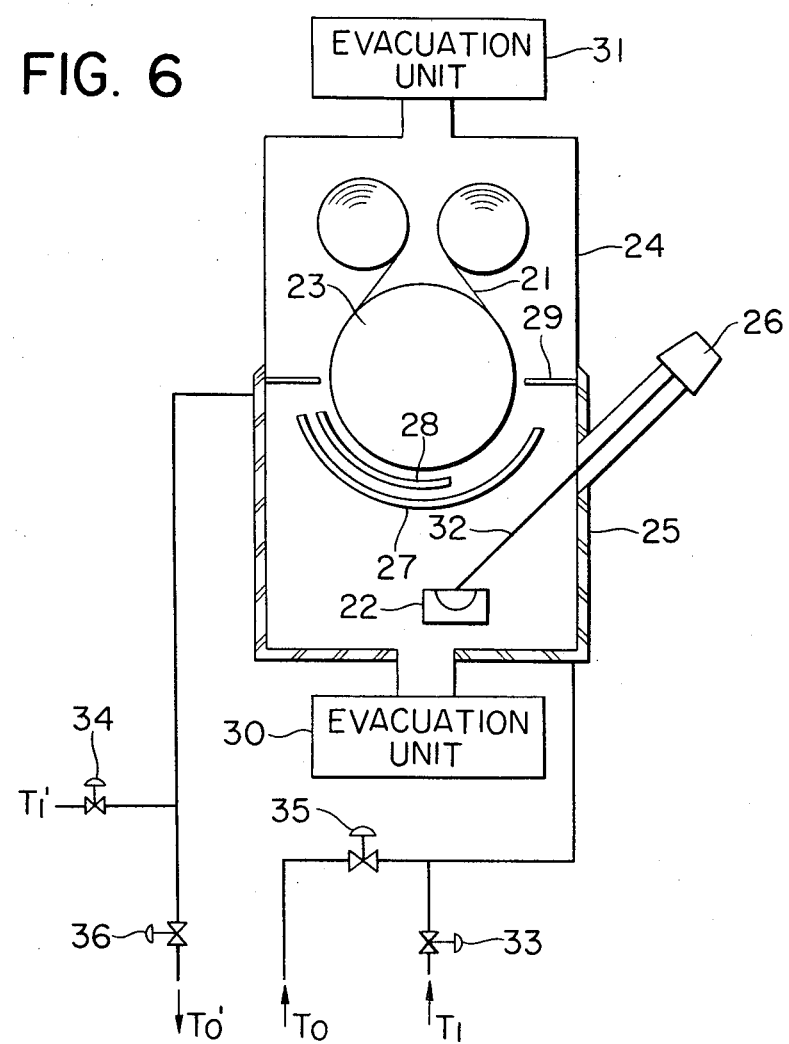
FIG. 6 is a view showing the overall arrangement of a deposition device according to the method of the present invention.

FIG. 6 shows a device which practices the method of the present invention. A vacuum chamber wall 25 receives radiation energy radiated from a vapor source 22 when the vapor source 22 is kept at a high temperature and has a jacket structure. Inside the jacket, a medium at a certain temperature can be circulated. Valves 33 and 34 are opened, while valves 35 and 36 are closed. The heating medium is then circulated. Thereafter, the valves 33 and 34 are closed and the valves 35 and 36 are opened. Then, the refrigerant is circulated.

A vacuum chamber 24 is subdivided into upper and lower compartments by a partition wall 29. A take-up mechanism and an electrical discharge mechanism are arranged in the upper compartment. The vapor source 22, a vapor material supply unit, a shutter 27 and a mask 28 are arranged in the lower compartment. The rotary support body 23 is disposed so as to move a polymeric base body therealong. The rotary support body 23 need not be a can in which a medium at a proper temperature is circulated. The rotary support body 23 may thus comprise an endless belt at a proper temperature. Reference numerals 30 and 31 denote evacuation units. Reference numeral 26 illustratively denotes an electron beam generator for giving energy to the vapor source 22. The parts to be arranged in a jacket structure are parts, excluding the vacuum chamber wall 25, which receive radiation energy from the vapor source. Therefore, the shutter 27 and the mask 28 preferably have a jacket structure. The medium circulating paths may be series-connected or connected in a combination of paths connected in parallel to and in series with each other, as needed.

The outer dimensions of the rectangular vacuum chamber are 2 m in width, 2 m in height, and 1 m in depth. A cylindrical can which has a diameter of 85 cm is disposed substantially at the center of the vacuum chamber. The outer wall of the lower compartment has a jacket structure. The mask and the shutter have the same structure as the outer wall of the lower compartment. An oil diffusion pump of 36,000 l/sec is disposed in the lower compartment, whereas an oil diffusion ejector pump of 4,000 l/sec is disposed in the upper chamber.

Co-Ni alloys (Ni : 10%, 20% and 25%, respectively) are vaporized by electron beam heating, and oxygen is supplied to the vacuum chamber at a pressure of $5 \times 10^{-5}$ to $7 \times 10^{31\ 5}$ Torr. Magnetic layers of 0.13 μm thickness are respectively deposited on polyethylene terephthalate films of 9.5 μm thickness. At this time, Q is 12 Torr l/sec. Each base body, of an overall length of 5,000 m and a width of 500 mm with the deposited magnetic layer thereon, is cut into magnetic tapes each of which has a width of ½" (12.7 mm). The magnetic characteristics of the magnetic tape are examined.

At this time, the atmospheric gas is evacuated from the vacuum chamber, and the heating medium at a temperature of 160° C. is simultaneously circulated in the outer wall, the mask and the shutter so as to set the vacuum chamber at a pressure of $1 \times 10^{-4}$ Torr. Thereafter, the electron beams are radiated onto the vapor material to preliminarily melt it. Thus, the vapor material is preheated. After 40 minutes, a refrigerant at a temperature of 0° C. is supplied to the vacuum chamber, this case being defined as case A. Another case is defined as case B in which a refrigerant at a temperature of 20° C. is supplied to the vacuum chamber. Still another case is defined as case C in which industrial water (temperature: 20° C. to 25° C.) is circulated without circulating the heating medium beforehand. The coercive forces of the tapes are measured for cases A, B and C. The figures show changes in the coercive force of an area of 50 m having the given tape position as its center.

|  |  | Tape Position | | |
| --- | --- | --- | --- | --- |
|  |  | 100 m | 2,000 m | 4800 m |
| Present Invention | A | ±3% | ±3.3% | ±3.2% |
|  | B | ±3.1% | ±3.4% | ±3.4% |
| Prior Art | C | ±9.5% | ±9.1% | ±12.1% |

In case A, Q' is kept at 0.45 Torr l/sec; in case B, Q' is kept at 0.58 Torr l/sec; and in case C, Q' is kept at 1.9 Torr l/sec.

In summary, the gas containing at least oxygen is sprayed so as to direct a vapor flow toward the base body through the vicinity of the incident angle control portion of the mask, and the supply conditions of the gas are properly determined. Highly reliable magnetic media can be mass-produced. Thus, a novel recording medium for satisfying the needs of short wavelength magnetic recording can be abundantly supplied.

What is claimed is:

1. A method for manufacturing a magnetic recording medium comprising the step of depositing a ferromagnetic material on a polymeric base body which is moved along a cooling support body in a vacuum chamber using an incident angle control mask for controlling a vapor flow, while spraying a gas from the vicinity of an incident angle control portion of said mask.

2. A method according to claim 1, wherein said gas which is sprayed contains oxygen.

3. A method according to claim 2, wherein deposition is performed to satisfy an inequality $Q > 10Q'$ where Q is an amount of gas containing at least oxygen which is supplied to said vacuum chamber, and Q' is a sum of the amounts of released gas and leakage air from said vacuum chamber.

4. A device for manufacturing a magnetic recording medium, comprising: a support body for cooling and supporting a polymeric base body which is being moved therealong; a vapor source for depositing a ferromagnetic material on said polymeric base body which is being moved along said support body; and an incident angle control mask for controlling an angle of incidence of a vapor flow from said vapor source to said polymeric base body; wherein gas spray nozzles are formed in the vicinity of an incident angle control section of said incident angle control mask.

* * * * *